United States Patent [19]
Husby

[11] Patent Number: 5,996,421
[45] Date of Patent: Dec. 7, 1999

[54] SEAT BELT TENSION SENSOR EMPLOYING FLEXIBLE POTENTIOMETER

[75] Inventor: Harald Snorre Husby, Lakeland, Fla.

[73] Assignee: Breed Automotive Technology, Inc., Lakeland, Fla.

[21] Appl. No.: 09/066,009

[22] Filed: Apr. 24, 1998

[51] Int. Cl.[6] ..................................................... G01L 1/04
[52] U.S. Cl. ................... 73/862.451; 73/862.453
[58] Field of Search ................. 73/862.391, 862.42, 73/862.451, 862.453, 862.471, 862.472, 862.473, 862.474

[56] References Cited

U.S. PATENT DOCUMENTS

| | | | |
|---|---|---|---|
| 3,618,378 | 11/1971 | Shull et al. | 73/862.474 |
| 3,817,093 | 6/1974 | Williams | 73/862.474 |
| 3,868,662 | 2/1975 | Russell Jr. | 73/862.471 |
| 5,087,075 | 2/1992 | Hamaue | 280/806 |
| 5,181,739 | 1/1993 | Bauer et al. | 280/807 |
| 5,309,135 | 5/1994 | Langford | 338/211 |
| 5,364,129 | 11/1994 | Collins et al. | 280/806 |
| 5,454,591 | 10/1995 | Mazur et al. | 280/735 |
| 5,494,311 | 2/1996 | Blackburn et al. | 280/735 |
| 5,570,903 | 11/1996 | Meister et al. | 280/735 |
| 5,583,476 | 12/1996 | Langford | 338/211 |
| 5,605,348 | 2/1997 | Blackburn et al. | 280/735 |
| 5,618,056 | 4/1997 | Schoos et al. | 280/735 |
| 5,636,864 | 6/1997 | Hori | 280/735 |
| 5,728,953 | 3/1998 | Beus et al. | 73/862.472 |
| 5,775,618 | 7/1998 | Krambeck | 242/372 |
| 5,831,172 | 11/1998 | Kidd | 73/828 |

OTHER PUBLICATIONS

Magnetic Field Sensors for Magnetic Position Sensing in Automotive Applications; GM R & D –8651; Joseph P. Heremans, Physics & Physical Chemistry Dept., Apr. 1997.

*Primary Examiner*—Max Noori
*Attorney, Agent, or Firm*—Lonnie Drayer; Beth Vrioni

[57] ABSTRACT

Seat belt tension is determined by measuring the resistance of a flexible potentiometer which is deformed to produce a controlled change in resistance with increased belt tension. A seat belt mounting has a spring which allows limited extension of the seat belt in response to belt tension. A flexible potentiometer is mounted to the spring so that spring deformation produces a change in resistance which can be directly correlated to belt tension. Belt tension is input to an airbag deployment logic which may incorporate a seat position sensor, a weight-on-seat sensor and various other sensors which detect the existence, size and direction of any crash. The logic draws conclusions from the tension sensor in the seat belt and other sensors to determine if deployment of the front passenger airbag is likely to be advantageous to an occupant of the front passenger seat.

14 Claims, 2 Drawing Sheets

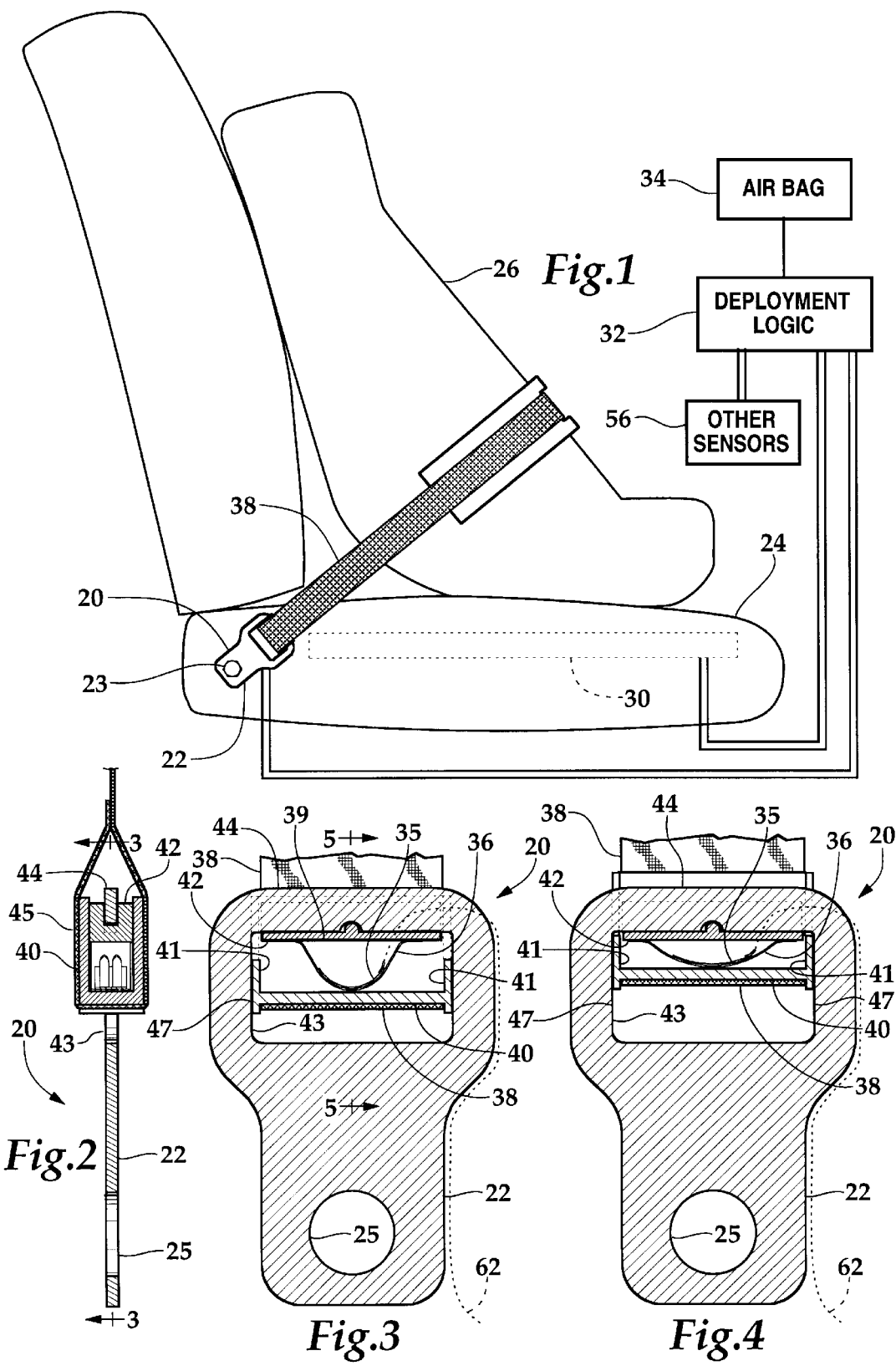

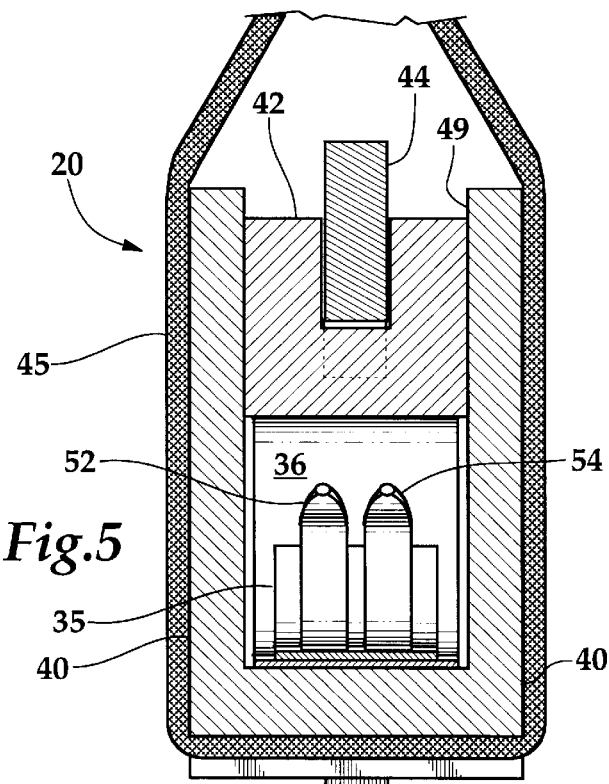
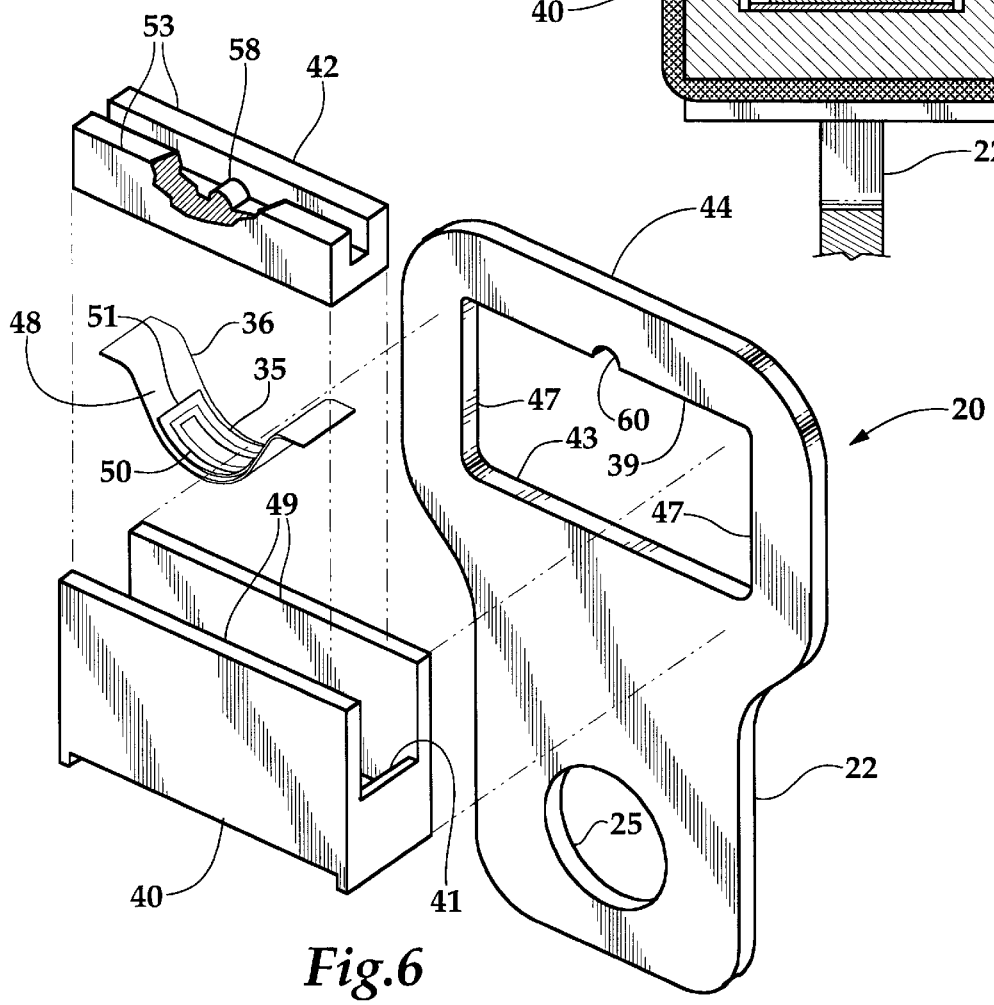

SEAT BELT TENSION SENSOR EMPLOYING FLEXIBLE POTENTIOMETER

FIELD OF THE INVENTION

The present invention relates to sensors used to determine when and how an airbag should be deployed in general and to sensors for monitoring tension applied to a seat belt in particular.

BACKGROUND OF THE INVENTION

Airbags were developed to protect occupants of cars during vehicle crashes. Originally airbags were viewed as an alternative to seat belts, because they are passive devices which do not require the cooperation of the car's occupants to be effective. However, experience has shown that airbags should be considered an adjunct to seat belts. When used properly, airbags can in certain crash situations reduce injuries to occupant. An airbag is a gas-filled bag which is rapidly deployed in the event of a vehicle crash. When appropriate crash sensors determine that a crash has occurred, the airbag is rapidly inflated to create an impact cushion between the occupant(s) of a vehicle and the structure of the vehicle. Consideration is also being given to the design of airbags which better position the vehicle occupant(s) to withstand crash-induced accelerations.

An airbag system is made up of two basic functional components: the airbag module, including the means for deploying the airbag; and the sensors and circuitry which determine whether the airbag should be deployed.

Recently sensors have been developed to determine the weight imposed on the front seat, and the value of the determined weight may then be used as an input into the system logic which determines whether or not an airbag should be deployed or whether the mode of deployment should be modified in airbag systems which are capable of varying the deployment sequence to accommodate varying circumstances. In some cases, however, these weight sensors can be confused by loads imposed by the compression of the seat resulting from installing a child's car seat and tensioning the seat belt to hold the child seat into place.

One proposed solution is to place a device on each child seat which can be detected by a sensor and thus used to determine the presence of a child seat. However, this approach relies on gaining cooperation of all manufacturers of child car seats and it would take many years before all old child car seats would be replaced with child car seats containing the needed sensor. What is needed is a sensor which can provide data for determining whether a child's car seat is positioned in the front passenger seat of an automobile.

SUMMARY OF THE INVENTION

The sensor of this invention determines seat belt tension by measuring the resistance of a flexible potentiometer which is deformed to produce a controlled change in resistance in response to the application of tension to a seat belt. A seat belt mounting incorporates a spring which allows limited extension of the seat belt in response to belt tension. A flexible potentiometer is bonded to the spring, for example of the type described in U.S. Pat. No. 5,583,476 to Langford which is incorporated herein by reference. The flexible potentiometer is mounted to the spring so that spring deformation produces a change in resistance which can be directly correlated to belt tension. Belt tension is then used as one input to an airbag deployment logic which may incorporate inputs from other sensors such as a seat position sensor, a weight-on-seat sensor, and the other sensors used to detect the existence, size and direction of any crash.

The airbag deployment logic draws conclusions from the tension in the seat belt and inputs from other sensors to determine if deployment of the front passenger airbag is likely to be advantageous to an occupant of the front passenger seat.

It is a feature of the present invention to provide a sensor which can detect seat belt tension.

It is another feature of the present invention to provide an airbag deployment system which employs seat belt tension as an input to airbag deployment logic.

It is a further feature of the present invention to provide a mechanism for bending a sensor in a way which is proportional to the load imposed on the sensor.

Further objects, features and advantages of the invention will be apparent from the following detailed description when taken in conjunction with the accompanying drawings.

BRIEF DESCRIPTION OF THE DRAWINGS

FIG. 1 is a side elevational schematic view of a child car seat positioned on the front passenger side seat, with a schematic representation of the airbag and its deployment logic.

FIG. 2 is a side elevational cross-sectional view of the seat belt tension sensor of this invention.

FIG. 3 is a cross-sectional view of the sensor of FIG. 2 taken along section line 3—3.

FIG. 4 is a cross-sectional view of the sensor of FIG. 2 shown with the seat belt under tension.

FIG. 5 is an enlarged cross-sectional view on the seat belt tension sensor of FIG. 3 taken along section line 5—5.

FIG. 6 is an exploded isometric view of the seat belt tension sensor of FIG. 2.

DESCRIPTION OF THE PREFERRED EMBODIMENT

Referring more particularly to FIGS. 1–6, wherein like numbers refer to similar parts, a seat belt tension determining sensor 20 is deployed in an automobile in connection with a front passenger seat 24, as shown in FIG. 1. The sensor 20 is part of a seat belt hold-down bracket 22 which has a lower hole 25 through which a fastener 23 extends to connect the bracket to an automotive passenger seat 24 or, more typically, to a structural member attached to the frame of a vehicle. The belt tension sensor 20 is used to detect seat belt tension which is indicative of a child seat 26 being held by the seat belt 38 on the front passenger seat 24. A weight sensor 30 detects the weight on the front passenger seat 24. The outputs of the weight sensor 30 and the belt tension sensor 20 are supplied to the airbag deployment logic 32 which determines when and if an airbag 34 should be deployed.

Some airbags are designed with two inflation gas sources which allows the airbag to be deployed using either one or both inflation gas sources. When a dual inflation gas source airbag is deployed using only one inflation gas source, it has the effect of reducing the airbag deployment velocity.

Airbag deployment logic may operate so that an airbag is not deployed, or with a dual inflation gas source system only one inflation gas source is activated, in circumstances where full deployment is not appropriate. Input to the airbag deployment logic can use information about the occupant of the front passenger seat. Sensors which can supply information about the occupant of the front passenger seat include sensors that determine the weight placed on the front seat, sensors that determine seat position, sensors that detect that the seat belt is latched, and sensors which detect seat belt tension. A sensor which measures the weight of the front passenger seat occupant has a good potential to determine the size and nature of the occupant with a single easily characterized variable. One approach to determining the nature of the front passenger seat occupant for use in the deployment logic, is to conclude that the front passenger seat is occupied by a full size adult when the weight sensor detects a load level which is above some predetermined amount which represents the maximum weight of a child, or a child in a car seat.

However a source of possible confusion is introduced by the loading the front passenger seat experiences due to tension in the seat belt holding the child car seat in place. Properly installed a child car seat should be tightly restrained by the seat belt. This tension produces a compression on the seat which is measured as additional weight by the occupant weight sensor 30. It is desirable to determine the seat belt tension because high seat belt tension is indicative of a child car seat being present, and in addition, the amount of tension can be used to determine the true weight of the front passenger seat occupant. This information can in turn be used by the airbag deployment logic 32.

As shown in FIG. 6, the seat belt tension sensor 20 has a deformable flexible resistor 35 which is bonded to a generally U-shaped spring 36 which is disposed in a rigid trough-like slide 40 which is retained in an upper opening 43 in the hold down bracket plate 22. A spring retainer 42 overlies the spring 36 and travels within the trough side walls 49 of the slide 40. The flexible seat belt 38 loops through the upper opening 43 in the bracket and around the slide 40. As shown in FIGS. 3 and 4, increased belt tension causes the compression of the spring 36 between the floor of the slide 40 and the underside of the retainer 42 as the slide 40 is drawn upwardly within the bracket upper opening 43.

The flexible resistor 35, since it is affixed to the spring 36, deflects with the spring when tension loads are placed on the belt 38. The spring 36 may be constructed of beryllium copper or other durable spring material. The spring slide 40 travels within the generally rectangular bracket upper hole 43. The upper side 39 of the bracket plate 22 defines an integrally formed cross member 44 which is enclosed within the loop 45 formed by the seat belt. When tension is applied to the seat belt 38, the loop 45 is pulled toward the cross member 44. The spring retainer 42 has a center stud 58, shown in FIGS. 3 and 6, which engages within a mating detent 60 in the cross member 44 which restricts the sideward travel of the retainer with respect to the bracket plate 22.

The slide 40 has upwardly facing stops 41 extend between the two side walls 49, as shown in FIG. 6, and which engage against the parallel sides 47 of the bracket plate 22 on either side of the bracket upper hole 43. The stops 41 limit the upward travel of the slide 40 by engaging the cross member 44, and thereby prevent the spring 36 and flexible resistor 35 from being crushed between the slide 40 and the spring retainer 42. The parallel sides 47 meet the cross member 44 at right angles.

When tension is applied to the seat belt 38, the loop 45 is displaced upwardly, bringing the spring slide 40 toward the cross member 44, and compressing the spring 36 and the flexible resistor 35 between the slide 40 and the spring retained 42, as shown in FIG. 4. With increasing tension, the displacement is away from bolt 23 or other means by which the bracket 22 is mounted to the automobile, and toward the spring retainer 42. The side walls 49 of the slide 40 engage against adjacent sides 53 of the spring retainer 42 capturing the slide 40 within the rectangular opening 43. The motion of the spring slide 40 towards the slide retainer 42 compresses the spring 36 thereby changing the shape of the spring 36 from a deep convex U-shape as shown in FIG. 3 to a more shallow convex U-shape as shown in FIG. 4.

The thin film resistor 35, which may be of the type described in U.S. Pat. No. 5,583,476 to Langford, is fabricated on a substrate 51 which is bonded to the inside surface 48 of the convex spring 36. The thin film resistor substrate 51 is preferably bonded to the spring 36 with double-sided adhesive tape such as Scotch™ VHB™ tapes available from 3M Corporation, St. Paul, Minn. U.S.A. (www.3m.com/market/construction/). The resistor 35 will preferably have a U-shaped profile 50 as shown in FIG. 4 so that two leads 52, 54 connected across the resistor 35 can be positioned adjacent to each other as shown in FIGS. 3 and 4. A wire 62, shown in FIG. 3, extends from the leads to transmit information from the sensor to the logic 32. As the shape of the spring 36 changes in response to tension in the belt 38 moving the spring slide 40 toward the spring retainer 42 the resistor 35 which is bonded to the spring 36 also changes shape.

Changes in the shape of the spring 36 to which the resistor 35 conforms, produces changes in the resistance of the resistor 35. The change in resistance increases with belt tension. While change in resistance is not necessarily linear with respect to belt tension, resistance changes are continuous and repeatable. Thus the amount of tension in the belt 38 for a given change in resistance can be determined by the electronics in the deployment logic 32 by means of a function or a lookup table. The spring 36 will typically have a total compression force of about eighty-nine newtons (twenty pounds) when the slide stops 41 are abutting the cross member 44. A tension of about nine kilograms (twenty pounds) greatly exceeds the seat belt tension that any passenger is likely to find tolerable.

The airbag deployment logic 32 receives inputs from other sensors 56, principally shock sensors, but also sensors detecting seat position and other parameters related to passenger size and position. The sensor inputs are used by the deployment logic 32, which typically is implemented on a microprocessor or micro controller. The logic 32 uses the available information to decide whether deployment of one, or possibly multiple airbags, will produce the greatest likelihood of minimizing injuries to the vehicle occupant during a crash.

It should be understood that various flat film sensors which respond to being bent could be used in the seat belt tension sensor 20. Sensors which change resistance, or sensors based on inductive or reactive resistance could also be used.

It should be understood that surfaces that come in contact with the seat belt may be rounded to prevent seat belt wear.

It is understood that the invention is not limited to the particular construction and arrangement of parts herein illustrated and described, but embraces such modified forms thereof as come within the scope of the following claims.

What is claimed is:

1. An apparatus for measuring tension in a seat belt comprising:
   a belt bracket for mounting a seat belt, the bracket having portions defining a belt retaining hole and portions forming a means for mounting the bracket;

a belt passing through the hole in the belt bracket and forming a loop which encloses a cross member which is formed as a portion of the bracket, the cross member being spaced from the portion forming the means for mounting and the cross member defining a direction from the means for mounting toward the cross member;

a spring positioned between the loop formed by the belt and the cross member so that motion of the loop in the defined direction away from the means for mounting, draws the spring toward the cross member elastically deforming the spring; and a sensor positioned between the loop and the cross member so that motion of the loop in the defined direction away from the means for mounting, draws the sensor toward the cross member elastically deforming the sensor, so tension on the belt can be determined by monitoring an output from the sensor which is correlated with elastic deformation of the sensor.

2. The apparatus for measuring tension in a seat belt of claim 1 wherein the sensor is bonded to the spring so that the spring and sensor are deformed together.

3. The apparatus for measuring tension in a seat belt of claim 2 further comprising a spring carrier positioned between the loop and the spring, and wherein the seat belt retaining hole has a first side, an adjoining second side which meets the first side at approximately a 90-degree angle, a third side opposite the first side and parallel to the first side, the third side adjoining the second side at an angle of approximately 90 degrees, the second side being formed by the cross member, wherein the spring carrier is positioned between the first side and the third side.

4. The apparatus for measuring tension in a seat belt of claim 3 further comprising a spring retaining member engaged with the second side, the retaining member providing a surface facing the spring carrier and positioning the spring between the carrier and the retaining member.

5. The apparatus for measuring tension in a seat belt of claim 4 wherein the spring carrier has sides which extend toward the second side and engage the spring restraining member to enclose the spring and guide the movement of the spring carrier.

6. The apparatus for measuring tension in a seat belt of claim 1 wherein the spring is of the leaf spring type and wherein the sensor is bonded to the spring with double sided adhesive tape.

7. The apparatus for measuring tension in a seat belt of claim 1 wherein the sensor is a variable resistor of the type which changes resistance when elastically deformed.

8. The apparatus for measuring tension in a seat belt of claim 1 further comprising:

an airbag;

a deployment logic device, wherein the deployment logic device receives a signal from the sensor by monitoring an output from the sensor which is correlated with elastic deformation of the sensor, the deployment logic being connected to the airbag so as to deploy the airbag when the logic indicates such deployment to be desirable.

9. An apparatus for measuring tension in a seat belt comprising:

a concave leaf spring;

a sensor mounted on the leaf spring so as to be deformable with the leaf spring;

a first member engaging the leaf spring;

a second member spaced from and opposed to the first member, the second member movable toward the first member, the first member and second member positioned to retain the leaf spring.

10. The apparatus for measuring tension in a seat belt of claim 9 wherein the sensor is bonded to the spring with double sided adhesive tape.

11. The apparatus for measuring tension in a seat belt of claim 9 wherein the first member has sides which extend on two sides of the second member, the first member being movable with respect to the second member which is engaged between the two sides, the spring being enclosed between the first member and the second member.

12. The apparatus for measuring tension in a seat belt of claim 9 wherein the sensor is a variable resistor of the type which changes resistance when elastically deformed.

13. The apparatus for measuring tension in a seat belt of claim 9 further comprising:

an airbag; and a deployment logic device which receives a signal from the sensor by monitoring an output from the sensor which is correlated with elastic deformation of the sensor, the deployment logic being connected to the airbag to deploy the airbag when the logic indicates such deployment to be desirable.

14. The apparatus for measuring tension in a seat belt of claim 9 further comprising:

a seat belt: and a metal bracket having portions defining a hole, wherein a portion of the seat belt passes through the hole and forms a loop thus engaging the belt with the metal bracket, wherein the first member and the second member are positioned within the loop and within the hole and the first member engages the loop and the second member engages the bracket.

* * * * *